United States Patent [19]

Sakamoto et al.

[11] Patent Number: 4,767,657
[45] Date of Patent: Aug. 30, 1988

[54] POLYESTER FILMS SUITABLE FOR USE IN MAGNETIC TAPES

[75] Inventors: Seiji Sakamoto; Yoshio Meguro, both of Yokohama, Japan

[73] Assignee: Diafoil Company, Limited, Tokyo, Japan

[21] Appl. No.: 883,285

[22] Filed: Jul. 7, 1986

Related U.S. Application Data

[63] Continuation of Ser. No. 765,188, Aug. 13, 1985, abandoned, which is a continuation of Ser. No. 183,277, Sep. 2, 1980, abandoned.

[30] Foreign Application Priority Data

Sep. 11, 1979 [JP] Japan ............................ 54-116315

[51] Int. Cl.$^4$ ............................................ B32B 27/18
[52] U.S. Cl. .................................... 428/143; 427/127; 427/128; 428/148; 428/149; 428/156; 428/323; 428/327; 428/328; 428/329; 428/331; 428/339; 428/409; 428/480; 428/483; 428/694; 428/695; 428/900; 428/910
[58] Field of Search ............... 428/143, 145, 149, 156, 428/323, 327–329, 331, 339, 409, 480, 483, 694, 695, 900, 910, 148; 427/127, 128

[56] References Cited

U.S. PATENT DOCUMENTS 3,983,285  9/1976  Riboulet et al. .................... 428/212
4,233,352 11/1980  Ono et al. ............................ 428/900
4,304,807 12/1981  Kawakami et al. ................ 428/409
4,348,446  9/1982  Mitsuishi et al. ................... 428/148

FOREIGN PATENT DOCUMENTS 2807147  9/1978  Fed. Rep. of Germany ...... 428/409

Primary Examiner—John E. Kittle
Assistant Examiner—P. R. Schwartz
Attorney, Agent, or Firm—Oblon, Fisher, Spivak, McClelland & Maier

[57] ABSTRACT

There is disclosed a polyester film suitable for use in magnetic tapes having the characteristics represented by the following equations:

$$N_1 \bar{h} \leq 2.3 \quad \text{(i)}$$

$$0.4 \leq \bar{\theta} \sqrt{\overline{H^2}} \quad \text{(ii)}$$

$$\bar{n} \leq 1.601 \quad \text{(iii)}$$

wherein
$N_1$ is the number of peaks of surface projections per millimeter;
$\bar{h}$ is the average height in $\mu$m of the surface projections;
$\bar{\theta}$ is the average steepness in degree of the surface projections;
$\overline{H^2}$ is the mean square height in $\mu$m$^2$ of the surface projections; and
$\bar{n}$ is the average refractive index.

8 Claims, 1 Drawing Sheet

POLYESTER FILMS SUITABLE FOR USE IN MAGNETIC TAPES

This application is a continuation of application Ser. No. 765,188, filed 8/13/85, now abandoned, which is a continuation of application Ser. No. 183,277, filed 9/2/80, now abandoned.

BACKGROUND OF THE INVENTION

1. Field of the Invention

This invention relates to polyester films having improved slip properties and durability and suitable for use in such applications as require a smooth surface. More particularly, it relates to a polyester film suitable for use in magnetic tapes which provides improvements in many respects including abrasion resistance and adhesion of magnetic layers thereto in tape making process as well as electromagnetic conversion characteristics, abrasion resistance, traveling property, etc. of magnetic tape products.

2. Description of the Prior Art

Polyester films, particularly polyethylene terephthalate films have been widely used as substrates in many applications such as magnetic tapes, capacitors, packages, printing plates, electric insulators, photographic films and the like because of their superior mechanical and electric properties and good chemical resistance and dimensional stability.

In particular, the use of polyester films as base films of magnetic tapes has outstandingly been expanded and they have been used in magnetic tapes for various purposes including audio, video and computer tapes. As a result, the requirements for the characteristics and properties of these tapes have become increasingly strict in recent years.

Among others, video recorders, particularly home video recorders, have spread at an outstanding rate and some home video recorders recently appearing on the market possess various functions such as fast moving, standing and slow moving of the picture and even intermittent tape feed.

Those tapes intended for use as video tapes must have the ability to always maintain a sharp and non-distorted picture and sound even when various operations of video recorders as mentioned above are repeated several hundred times in the surroundings of varying temperatures and humidities. In this respect, magnetic layers or coatings have, of course, undergone various improvements. In addition, the requirements for the characteristics and properties of polyester films used as base films for video tapes are much more strict than those of polyester films for audio tapes.

Among important properties required of base films for video tapes are abrasion resistance and adhesive property that are necessary during tape making process, so-called electromagnetic conversion characteristics which affects recordability and reproducibility of picture and sound of tape products, and abrasion resistance and traveling property which may cause some troubles during use of tapes.

Abrasion of such films may occur when a film or tape is exposed to considerable friction during film producing process, during tape making process prior to the step of coating the film with a magnetic layer, and during recording or playback of information. More specifically, when a polyester film is passed through a nip of rotating rolles or around a stop roll or free roll, etc., the film is worn away with generating abrasion powder (dust) out of the surface thereof. Such dust may contaminate the recording and playback system of the recorder, thereby causing various troubles.

Traveling property means the uniformity of traveling speed of a tape. Poor traveling property causes unevenness of traveling speed, which in turn leads to decrease in output of sound and picture quality of the tape and even to unstable traveling or failure of travel after repeated passes of the tape. Traveling property of a film has relation to the coefficient of friction of the film. As a matter of course, a film having poor slip property shows a poor traveling property. At present, there is an increasing need for long period tapes which is accomplished with a limited cassette size by tape feed at a low speed. Therefore, an improvement in traveling property, particularly at low traveling speeds is still desired.

The electromagnetic conversion characteristics of magnetic tapes, particularly video tapes have close relation to reproducibility of sound and picture. A magnetic material having a high residual magnetism and a high coercive force is employed in these tapes in order to attain a high output over a wide range of frequency ranging from several ten hertz (Hz) to several megahertz (MHz). In order to minimize the noise level (S/N ratio) each of color and brightness signals, reduction in particle size of the magnetic material and uniformly distributed coating thereof are necessary together with a certain finishing technique and the use of a base film of high quality. In order to achieve high density recording as a countermeasure for compaction of home video and other recorders, and S/N ratio should be improved. For this purpose, a magnetic layer must have a smooth surface so as to attain sufficiently close contact between the tape and video heads to minimize the so-called spacing loss. This also requires the underlying base film to have an improved thickness precision and surface smoothness. However, a film having a smooth surface is inferior in the foregoing abrasion resistance and traveling property.

Thus, in order to improve a tape in each respect of electromagnetic conversion characteristics, abrasion resistance and traveling property, the surface roughness of the base film needs to be adjusted or modified in opposite two directions which are incompatible with each other. In other words, the improvement in electromagnetic conversion characteristics can be accomplished generally by controlling the film surface in the direction of smoothing, while the improvement in abrasion resisting and traveling properties can be accomplished generally by controlling the same in the direction of roughening. It is very difficult for a film to have all the above-mentioned properties that are inconsistent with one another. For this reason, in base films for magnetic tapes currently available on the market, particularly in those films for video tapes that have more strict requirements for the abrasion resisting and traveling properties, primary importance is placed on roughening of film surface at a certain sacrifice of electromagnetic conversion characteristics.

As an attempt to provide a base film with each of the above-mentioned properties, it has heretofore been proposed to employ a double-layer laminate film having a smooth surface on the side to be coated with a magnetic layer and a rough surface on the opposite side. Also it has been proposed to subject the surface of a base film to chemical treatment only on one side. These techniques, however, cannot provide satisfactory solutions since even with these techniques it is not impossible to avoid contact of the smooth surface with a roll during film processing. In addition such techniques are cost-consuming so that they have not yet received practical application. The so-called back coating method in which a base film is coated with such material as carbon on the side facing away the magnetic layer also involves various problems in that it adds to the complexity and cost of the film processing and that it goes against the current tendency to reduce tape thickness in order to accomplish long-period tapes.

SUMMARY OF THE INVENTION

In order to overcome the above-mentioned various problems of the prior art base films, we have studied various factors of film including the number and height of projections on the film surface, surface hardness and the like. As a result, it has now been found that the requisite properties for the base film which include primarily electromagnetic conversion characteristics represented by the S/N ratio, abrasion resistance and traveling property can be improved at the same time to satisfactory levels with maintaining mechanical properties comparable or superior to those of prior art base films, said improvement being accomplished by controlling a combination of the configuration, height and number of projections on the film surface within a certain range while maintaining the surface hardness of the film within a certain range.

Thus, the present invention provides a polyester film suitable for use in magnetic tapes having the characteristics represented by the equations:

$$N_1 \bar{h} \leq 2.3 \qquad \text{(i)}$$

$$0.4 \leq \bar{\theta} \sqrt{\bar{H^2}} \qquad \text{(ii)}$$

$$\bar{n} \leq 1.601 \qquad \text{(iii)}$$

wherein $N_1$ is the number of peaks of surface projections per millimeter;

$\bar{h}$ is the average height in μm of the surface projections;

$\bar{\theta}$ is the average steepness in degree of the surface projections;

$\bar{H^2}$ is the mean square height in μm² of the surface projections; and $\bar{n}$ is the average refractive index.

DETAILED DESCRIPTION OF THE INVENTION

Figure 1:
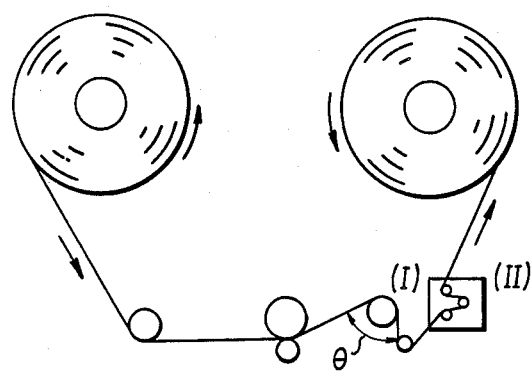
FIG. 1 illustrates a traveling system for use in evaluation of abrasion resistance wherein (I) indicates a hard chromium stationary pin of 6 mm diameter, (II) does a tension meter and $\theta$ is 130°.

Further details of the present invention will be found in the following description.

The term "polyester film" used herein means a film made of a polymer comprising predominantly ethylene terephthalate units, such as polyethylene terephthalate and a copolymer thereof with another comonomer. In the case of a copolymer, ethylene terephthalate units preferably comprises at least 80 mol % of the copolymer. Polyester films can be produced by melt-extruding a sheet of such a polymeric material alone or in admixture with one or more other polymers and/or various additives followed by cooling and solidification of the sheet and drawing or orientation thereof.

In accordance with the present invention, the polyester film should have surface conditions and refractive index which satisfy the above equations (i) to (iii).

The product of the number of surface projections and the average height thereof ($N_1 \bar{h}$) represented by equation (i) is a measure of the surface roughness that has close relation to the electromagnetic conversion characteristics of the film. The value of $N_1 \bar{h}$ should not exceed 2.3, preferably 2.0. If $N_1 \bar{h}$ exceeds 2.3, large projections, for example, having heights of at least 0.2 μm may occur on the film surface. In the actual circumstances, base films for the current video tapes have a tendency toward reduction in dimensions of surface projections. In fact, a $N_1 \bar{h}$ value of more than 2.3 does not result in improved electromagnetic conversion characteristics. The electromagnetic conversion characteristics are improved with decreasing $N_1 \bar{h}$ value, although the value of $N_1 \bar{h}$ is preferably at least 0.7. A $N_1 \bar{h}$ value of less than 0.7 will not provide an adequate slip property even if equation (ii) is fulfilled. In the conventional prior art magnetic tapes, the value of $N_1 \bar{h}$ is usually larger than 2.4, and in the commercially available video tapes it is generally within the range of 2.4 to 2.8.

The average steepness of surface projections ($\bar{\theta}$) has relation to both the configuration and number of the projections, while the average root-mean-square height ($\sqrt{\bar{H^2}}$) relates to the proportion of relatively large projections. Upon our study on the correlation between slip property and these values of a film at different film traveling speeds, we have found that the product of the value for $\bar{\theta}$ and that for $\sqrt{\bar{H^2}}$ has close relation to traveling property of the film or tape. Thus, a satisfactory slip property can be attained by a film having a $\bar{\theta}\sqrt{\bar{H^2}}$ value of at least 0.4, preferably at least 1.0 in combination with a $N_1 \bar{h}$ value of not more than 2.3 which is selected for the improvement of electromagnetic conversion characteristics. If the value of $\bar{\theta}\sqrt{\bar{H^2}}$ is less than 0.4, the tape has an undesirable poor traveling property which may cause interruption of tape travel. On the other hand, an excessively large value of $\bar{\theta}\sqrt{\bar{H^2}}$ provides a tape with poor electromagnetic conversion characteristics so that the value of $\bar{\theta}\sqrt{\bar{H^2}}$ is preferably below 3.2, more preferably below 2.9.

The average refractive index $\bar{n}$ has relation to abrasion resistance of the film. In order to achieve the objects of the present invention, the value $\bar{n}$ should be 1.601 or less, preferably 1.599 or less. If $\bar{n}$ is greater than 1.601, the surface of film is so hard that the film surface tends to undergo brittle fracture or breakdown upon friction between the film and any of various materials, generating a large amount of abrasion dust. In view of improvement in abrasion resistance it is preferred that the value $\bar{n}$ be as small as possible. However, a film having a $\bar{n}$ value of 1.595 or less, particularly 1.593 or less has a poor thermal dimensional stability which may interfere with the processing and use of the tape. A $\bar{n}$ value of not greater than 1.601 brings about additional favorable results with respect to adhesion between the film and a magnetic layer.

A polyester film having a certain surface roughness as defined above can be prepared by various methods. Among these, the following two methods can be particularly readily performed in commercial operation.

One of these methods capable of producing the above-mentioned surface roughness is the use of a polyester prepared by the so-called precipitation method wherein the residue such as catalyst used in the preparation of polyester is precipitated in the polymer as fine particles inert to the polyester. More particularly, according to this method, an ester exchange catalyst such as calcium or lithium is precipitated as a fine particulate compound during the subsequent polymerization (polyester forming) step in the presence or absence of a phosphorus compound. In practice of this method, it is particularly preferred that a phosphorus compound be present at least in a stoichiometric amount based on the metallic compounds so as to precipitate the metallic compounds as microparticles of their phosphate or phosphite derivatives, since such microparticles, unlike microparticles of a metal salt derivative of a polyester oligomer, generally exhibit a good affinity for polyester and are therefore difficultly removed therefrom.

When the above-mentioned precipitation method is used to precipitate phosphate or phosphite microparticles in a polyester matrix, a particularly suitable film having the desired surface roughness can be obtained from any of the following polyester materials prepared by the precipitation method:

(1) a polyester material obtained by conducting an ester exchange reaction in the presence of a lithium and calcium compounds and then adding to the reaction mixture one to two equivalents of a phosphorus compound based on the total amount of these metallic compounds prior to the subsequent polycondensation reaction;

(2) a polyester obtained by adding a lithium and/or calcium compound before or after the completion of an ester exchange reaction and then adding to the reaction mixture one to two equivalents of a phosphorus compound based on the total amount of these metallic compounds prior to the subsequent polycondensation reaction;

(3) a blend of two or more of the foregoing polyester materials (1) and (2).

In any case the polyester materials contain precipitated particles comprising lithium, calcium and phosphorus elements. Further details of the precipitation method for preparing these polyesters will be found below.

The lithium compound added to an ester exchange system may be any compound which is soluble in ethylene glycol or polyester oligomer. Exemplary of such lithium compound are lithium salts of aliphatic carboxylic acids such as acetic acid, propionic acid and butyric acid, lithium salts of aromatic carboxylic acids such as benzoic acids and p-methylbenzoic acids, and lithium glycolates of such glycols as ethylene glycol and propylene glycol.

Among others, lithium salts of aliphatic carboxylic acids, particularly lithium acetate, are preferred. The lithium compound is preferably used in an amount of 0.05 to 0.5 mol %, more preferably 0.2 to 0.4 mol % based on the total acid components of the polyester.

Similarly the calcium compound may be any compound soluble in ethylene glycol or polyester oligomer. Examples of such compound include calcium salts of aliphatic carboxylic acids such as acetic acid, propionic acid and butyric acid and aromatic carboxylic acids such as benzoic acid and p-methylbenzoic acid, and calcium glycolates of such glycols as ethylene glycol and propylene glycol..

Among others, calcium salts of aliphatic carboxylic acids, particularly calcium acetate, are preferred. The calcium compound is preferably used in an amount of 0.03 to 0.20 mol %, more preferably 0.08 to 0.15 mol % based on the total acid components of the polyester.

Useful phosphorus compounds include phosphoric acid, phosphorous acid and alkyl and aryl esters of these acids. A mixture of two or more members selected from the above group may be used. Particularly phosphoric acid and its lower alkyl esters are preferred.

The amount of such phosphorus compound used depends on the total amount of the lithium and calcium compounds as described below in detail, but in general it is selected between 0.1 and 0.8 mol %, preferably between 0.1 and 0.6 mol % based on the total acid components of the polyester since the addition of an excessively large amount of phosphorus compound may adversely affect the physical properties of the resulting polymer.

The equivalent ratio of phosphorus compound to metallic compounds referred to herein is the value calculated from the following equation:

$$P/(Ca+\tfrac{1}{2}Li)$$

wherein P, Ca and Li represent molar percents (mol %) of the phosphorus, calcium and lithium compounds, respectively, based on the total acid components in the raw materials of the polyester.

If the above ratio is less than one (1) (or the amount of the phosphorus compound is less than one equivalent), the precipitated particles, as previously mentioned, exhibit a poor affinity for polyesters. On the other hand, the use of the phosphorus compound in excess of two (2) equivalents may bring about undesirable effects, for example, prolongation of the polymerization time required and decrease in melting point of the polymer, without affecting the properties of the precipitated particles.

Preferably the phosphorus compound is added after the ester exchange or esterification reaction has been substantially complete and before the subsequent polymerization reaction is not yet initiated.

Any polycondensation catalyst known per se which may be selected from antimony compounds, germanium compounds, titanium compounds, tin compounds and mixtures thereof can be used in the polymerization stage. Antimony compounds, particularly antimony trioxide, are preferred catalysts.

The above-mentioned method of preparing polyester is particularly useful in obtaining a polyester film having the particular surface roughness as defined above, but there remains another requirement that is preferably satisfied in order to obtain a polyester film of the present invention using the precipitation method, as described below.

It has been found that even if one of the foregoing polyesters (1) to (3) which contain precipitated particles, particularly containing lithium, calcium and phosphorus is used it is difficult to obtain a polyester film havng the desired surface roughness directly from the polyester.

In a film made of a polyester material which is prepared with less amounts of lithium and calcium compounds and hence contains a less amount of precipitated particles, generally the value of $N_1\bar{h}$ is within the desired range, but the value of $\bar{\theta}\sqrt{H^2}$ is often less than 0.40 because of the smaller diameters of the precipitated particles than the desired dimension.

On the other hand, in a film made of a polyester material which is prepared with relatively large amounts of lithium and calcium compounds and hence contains a relatively large amount of precipitated particles of appropriately large diameters, generally the value of $\bar{\theta}\sqrt{H^2}$ is within the desired range, but the value of $N_1\bar{h}$ oftein exceeds the upper limits, 2.30.

Accordingly, in order to obtain a film of the present invention with good reproducibility and high stability, it is most preferred that the film be made from a blend of at least one of the foregoing polyester (1), (2) and (3) prepared with relatively large amounts of lithium and calcium compounds and at least one of another type of polyesters (diluent polyesters) which are substantially free from particles.

From this point of view, it is preferable in the preparation of polyesters (1) to (3) to use 0.2 to 0.4 mol % of a lithium compound together with 0.08 to 0.15 mol % of a calcium compound.

The polyester useful for the dilution should be substantially free from microparticles which are inert to the polyester. Examples of such particle-free diluent polyester are:

(a) a polyester obtained by an ester exchange reaction in the presence of a catalyst selected from such metal compounds as calcium, manganese, zinc, cobalt and magnesium compounds followed by polycondensation of the resulting ester wherein at the end of the ester exchange reaction, as required, a phosphorus compound is added in an amount of about 0.6 to 3 moles per mole of the metallic compound;

(b) a polyester obtained via an esterification reaction prior to polycondensation. Also in this case, if a calcium or other metallic compound is added before or after the esterification, a phosphorus compound should be added in an amount of about 0.6 to 3 moles per mole of the metallic compound.

Each of these particle-free polyesters, if used alone, forms a film having a good transparency and the surface of such film is smooth with little surface roughness.

The weight ratio of the particle-containing polyester to the particle-free polyester in the blend varies widely depending on the proportion and diameter of the precipitated particles in the particle-containing polyester which is the master polymer, and generally it ranges from about 2:1 to about 1:20, preferably from about 1:1 to about 1:10. When the weight ratio is within the above range, a film having the desired surface roughness can be obtained with good reproducibility.

The other method for producing a polyester film having the particular surface roughness as defined above is the use of a polyester material prepared by the so-called addition method wherein microparticles having a certain size distribution and insoluble in the polyester are added from the outside of the system.

The insoluble particles suitable for use as additives include salts and oxides of the Group II, III and IV elements in the Periodic Table, for example, calcium terephthalate, silica, alumina, calcium carbonate and the like.

In addition to these metallic compounds, insoluble and infusible, cross-linked high polymers in the form of fine powder are also useful as the additive. These cross-linked high polymers are in general copolymers of a compound having one aliphatic unsaturation in the molecule and a cross-linking compound having two or more aliphatic unsaturation in the molecular, but the cross-linked polymers are not limited thereto. Thus, any polymer having cross-linked structure may be used, provided that it is substantially infusible and insoluble in the polyester or its oligomer to which it is added. Typical of the above-mentioned copolymer are copolymers of methyl methacrylate-divinylbenzene and acrylic acid-divinylbenzene.

It is to be understood that not all the microparticles of the above-mentioned metallic compounds and cross-linked polymeric materials do satisfy the requirements of the present invention to a high degree. Among others, those particles which are relatively spherical in shape and have high dispersibility in and good affinity for the polyester are particularly useful. Of course, one or more of these properties may be sacrificed for another properties as long as the sacrifice does not interfere with the objects or advantages of the present invention.

In order to obtain a polyester film having the surface roughness as defined above, a polyester containing about 0.03–1.0% by weight of the above-mentioned insoluble particles with an average diameter of about 0.5–3.0$\mu$ may be prepared in accordance with the addition method and diluted as required prior to use. The polyester used as a diluent may be the same as that used for the dilution of the foregoing "precipitation method" polyester.

Of course a combination of a polyester prepared by the precipitation method and that prepared by the addition method can be used in the film-making process. In this case, also a diluent polyester may be added as required.

Of these two methods for the preparation of particle-containing polyesters, the precipitation method is more preferable, because the addition method requires the steps of milling and classification of particles in the preparation of the particles to be added, said steps involving complicated operation and requiring additional installations for the adjustment and storage of a slurry which adds to the production cost.

From the above-mentioned particle-containing polyester or polyester blend, a biaxially oriented polyester film can be obtained in a manner known per se using a conventional melt extrusion apparatus and a conventional film-making apparatus. For example, when two or more polyester materials are used in combination, they are passed to a known measuring device capable of precisely measuring each material in order to obtain a precise formulation and then thoroughly mixed and dispersed at room temperature. The blend is then dried and further dispersed at about 180° C. and at atmospheric or reduced pressure, and passed to a conventional extruder in which it is extruded through a die at 280°–310° C. and cooled on a casting drum at 20°–70° C.

to form an amorphous sheet, which is drawn longitudinally with a roll set at a temperature between 70° C. and 110° C. and then in the cross or transverse direction with a tenter at a temperature of 80° to 130° C. and finally subjected to heat setting at a temperature of 130° to 220° C. to obtain the desired biaxially oriented polyester film.

The average refractive index $\bar{n}$ can be controlled by selecting a suitable combination of the conditions under which the film is formed, that is, draw ratio, drawing temperature and crystallization condition. The average refractive index has particularly close relation to crystallization temperature and time. For example, heat setting at a temperature of 130° to 215° C. for 1 to 10 seconds provides satisfactory results. In the selection of a combination of the drawing and crystallization conditions, sufficient consideration must be paid so as to improve the efficiency of the process.

In the prior art magnetic tapes, the base films are heat-set at a temperature of 215° to 235° C. after orientation at a normal draw ratio. Such films have a $\bar{n}$ value ranging from 1.601 to 1.605 and are hence insufficient, particularly in abrasion resistance.

The present invention is realized by biaxially oriented films of 5 to 100μ thickness as well as the so-called tensilized film which is further strengthened in the longitudinal direction.

The films according to this invention has an advantage in that the properties are improved particularly in the region of low surface roughness. These films, therefore, are most suitably used as base films for video tapes which employ shorter wavelengths and which demand more strict requirements for the film surface properties than other magnetic tapes.

Having generally described the invention, a more complete understanding can be obtained by reference to certain examples which are provided herein for purposes of illustration only and are not intended to be limiting in any manner.

In the examples, all the parts are by weight.

In the examples, various properties were determined by the following methods.

(1) $N_1, \bar{h}, \bar{\theta}, \bar{H}^2$

The device used is a Kosaka Film Roughness Meter Model ET-10 (Kosaka Kenkyusho, Japan) of about 60 mm in measuring length; 50,000 longitudinal magnifications and 200 transverse magnifications.

Method for the Determination of Base Line:

On the chart of cross-sectional curve obtained, the first minimum point is taken as the starting point. Within the range of 80 μm from the starting point all the remaining minimum points are found out and a straight line connecting the first minimum (starting) point with each of the other minimum points is drawn. Of these straight lines, the line having the smallest slope is taken as the base line. Then, the minimum point selected for drawing the base line is taken as the second starting point and the second base line is drawn in a similar manner. The value each of $N_1, \bar{h}, \bar{\theta}$ and $\bar{H}^2$ is determined in both the machine and traverse directions and the mean values are calculated.

$N_1$: The cross-sectional curve is divided into consecutive 32 μm sections. Every maximum value in each section is picked out. If the greatest value in the section is found among the maximum values, it is taken as a peak. In this way the number of peaks (N) in the curve is counted and it is converted into a value for each millimeter ($N_1$).

$\bar{h}$ (μm): The value of $\bar{h}$ is calculated according to the following equation:

$$\bar{h} = \frac{\sum_{i=1}^{N} hi}{N}$$

wherein hi is the height of peak; and N is the number of peaks measured over a length of about 60 mm.

$\bar{\theta}$ (degree): The slope or angle of inclination of the cross-sectional curve is determined for each 4μ section and the average of these measurements ($\bar{\theta}$) is calculated.

$\bar{H}^2$ (μm$^2$): The value of $\bar{H}^2$ is calculated according to the following equation:

$$\bar{H}^2 = \frac{\sum_{i=1}^{N} (hi)^2}{N}$$

(2) $\bar{n}$

The refractive index is measured with an Abbe refractometer (manufactured by Atago, Japan) at a temperature of 20° C.±5° C. using the Na D-line. A polarized light filter is used for the measurement. Each of the principal refractive indices $n_\gamma$, $n_\beta$, $n_\alpha$ on the three principal axes of a film is measured at different five points and the average of these measurements is calculated and taken as $\bar{n}'$. The determination of n' is carried out on both sides of the film and the mean value $\bar{n}$ of the two n' values is calculated.

(3) Abrasion Resistance

A test film is traveled for a length of 150 m in a traveling system as shown in FIG. 1 and the amount of abrasion dust deposited on a hard chromium stationary pin of 6 mm diameter which is indicated by (I) in FIG. 1 is visually evaluated and ranked into the following four groups:

A—No deposition
B—Slight deposition but no hindrance to practical use
C—Heavy deposition with hindrance to practical use
D—Very heavy deposition to an impractical extent In addition, the test film is coated with a magnetic layer and slitted into tapes as described in (8) below, and the tape is run repeatedly on a practical tape deck. Upon repeated passes, the amounts of abrasion dust deposited on various parts are visually ranked. The results of the magnetic tape were in fair agreement with those of the film with respect to the above ranking.

The test conditions are: film traveling speed of 11.4 m/min.; tension of 170 to 220 g; and $\theta = 130°$.

(4) Traveling Property

Figure 2:
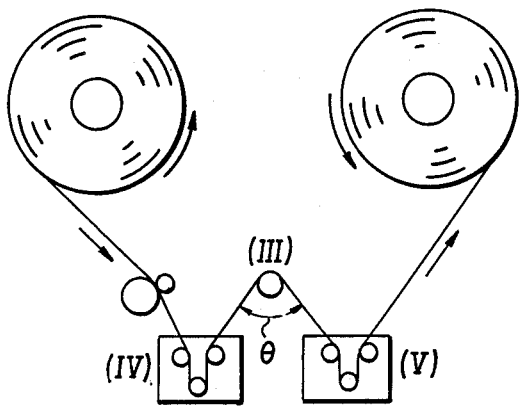
FIG. 2 illustrates a traveling system for use in evaluation of traveling property wherein (III) indicates a hard chromium stationary pin of 5 mm diameter, (IV) does an inlet tension meter, (V) does an outlet tension meter and $\theta$ is 107°.

A test film is run in a traveling system as shown in FIG. 2 and the coefficient of dynamic friction $\mu_D$ is measured at the place of a hard chromium stationary pin of 5 mm diameter which is indicated by (II) in FIG. 2. The test conditions are: temperature of 20±2° C., relative humidity of 60±10%, film traveling speed of 1.0 to 2.1 m/min. and $\theta$ of 107°. Also in this test, the film is fabricated into magnetic tape as described in (8) below and the tape is used repeatedly on a deck at different temperatures and humidities to evaluate its traveling property.

(5) Film Surface Hardness

Figure 3:
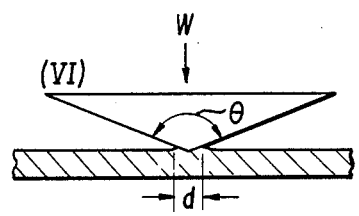
FIG. 3 shows a device for the measurement of film surface hardness wherein w indicates a load and (VI) does a conical indenter.

The surface of a film sample is scratched at a speed of 5 mm/min. with a conical indenter of 5 g in weight and 136° in angle between the opposite sides as shown in FIG. 3. The amount of applied load divided by the surface area of the formed scratch or identation, namely, $4 W.\sin(\theta/2)/\pi d^2$, is calculated and used as a measure of the surface hardness.

(6) Adhesion

A liquid, magnetic coating composition is prepared by ball milling the following ingredients for 40 hours.

| Ingredient | Part |
|---|---|
| $\gamma$-Fe$_2$O$_3$ | 100 |
| Poly (vinyl chloride-vinyl acetate)-copolymer (86:14) (Denka Vinyl # 1000 A) | 30 |
| Methyl ethyl ketone | 150 |
| Toluene | 150 |

With the resulting composition a test film is coated to a dry coating thickness of 5μ using a bar coater and dried at 80° C. The coated film is then slitted to 3.8 mm tape widths. The magnetic tape thus obtained is sticked on a stainless sheet with a double coated adhesive tape sandwiched between one surface of the stainless sheet and the coated surface of the magnetic tape so that the coated surface faces the stainless sheet. Thereafter the 180° peel strength is determined and converted into a strength for each 4 mm width, which is used as a measure of the adhesion.

(7) Electromagnetic Conversion Characteristics (Dropout) Using a magnetic film prepared as described in (8) below in combination with a commercially available video deck, Victor-HR-3300 (Victor Co. of Japan) and an NTSC pattern generator (Leader Denshi, Japan), color bar and dotted lattice images are generated on a TV receiver and visually evaluated. In addition, those dropouts which are attributable to the defect of the base film and have a signal output of 50% or less are counted with a dropout counter (Nippon Jido Seigyo, Japan).

(8) Preparation of Magnetic Tape

| Ingredient | Part |
|---|---|
| Ferromagnetic material predominantly comprising $\gamma$-Fe$_2$O$_3$ | 300 |
| Acrylonitrile-styrene (10:90)-copolymer (M.W. about 40,000) | 30 |
| Synthetic non-drying oil-modified alkyd polyol | 25 |
| Oleic acid | 6 |
| Dimethyl polysiloxane | 2 |
| Butyl acetate | 250 |
| Methyl ethyl ketone | 450 |

A mixture having the above composition is ball milled for 10 hours to obtain a dispersion, to which 28 parts of a polyisocyanate compound is added. The mixture is then further dispersed on a high-speed shear mill for an hour to yield a magnetic coating composition, with which a film is coated in a manner known per se (e.g., as described in Japanese Patent Application Laid-Open (KOKAI) No. 145302/1976) to a dry coating thickness of 4μ. The coated film is dried in a heated oven, then supercalendered and slitted to ½-inch tape widths.

EXAMPLE 1

In a reactor a mixture of 100 parts of dimethyl terephthalate, 75 part of ethylene glycol, 0.09 part of calcium acetate monohydrate and 0.19 part of lithium acetate dihydrate was heated to effect an ester exchange reaction, while the methanol formed by the reaction is distilled off. The temperature was raised to 230° C. for about 4 hours, whereby the ester exchange reaction was substantially completed.

The reaction mixture was then heated to 240° C. and 0.31 part of triethyl phosphate and 0.04 part of antimony trioxide were added in that order. The mixture was polymerized in a conventional manner to give a polyester (Material A).

The above-mentioned procedure was repeated except that the ester exchange catalyst comprised only 0.09 part of calcium acetate monohydrate and that 0.036 part of phosphoric acid was substituted for triethyl phsophate, to give another polyester (Material B).

Separately, 3.0 l of an aqueous 10% (v/v) calcium chloride solution was placed into a 20 l reactor equipped with a stirrer and 11.3 l of an aqueous 5% (w/v) sodium terephthalate solution was added with stirring. The precipitated calcium terephthalate trihydrate was collected by solid-liquid separation and heated for 2 hours at 200° C. to convert into the anhydrous salt. The resulting particles were plates of 2 to 4μ in thickness and 10 to 30μ in maximum diameter. A portion of the calcium terephthalate was ground on a ball mill for 1 hour, dispersed in ethylene glycol to form a 10% (w/v) slurry and classified through a centrifugal classifier of Kokusan type to obtain bulk anhydrous calcium terephthalate having an average diameter of 2.0μ.

Thereafter a polyester containing the finely divided calcium terephthalate particles thus obtained was prepared by the addition method. The procedure was the same as that employed in the preparation of Polyester Material B except that the addition of 0.036 part of phosphoric acid at the end of the ester exchange reaction is followed by the addition of 0.20 part of the calcium terephthalate of 2.0μ average diameter. The resulting calcium terephthalate-containing polyester (Material C) had an intrinsic viscosity of 0.67.

Chips of Materials A and B (both having an intrinsic viscosity of 0.68) and Material C were introduced at a weight ratio of A:B:C=30:69:1 into a blender in which they were blended, dispersed and dried. The mixture was then melt-extruded at 285° C. and cooled and solidified on a cooling drum set at 40° C. to form a 212μ thick amorphous sheet.

The sheet was drawn in a conventional way first in the longitudinal direction at a draw ratio of 3.7 with a roll set at 82° C. and then in the transverse direction at a draw ratio of 3.94 with a tenter at 110° C. The biaxially oriented film was heat-set at 150° C. for 1.5 seconds under 1.0% relaxation in the transverse direction and then completely heat-set at 150° C. under 1.72% relaxation in the transverse direction. Upon cooling the biaxially oriented film obtained was 15μ thick.

Following the procedure described in (8) above, the film was coated with the magnetic coating composition to a dry coating thickness of 4μ, dried and slitted to ½ inch tape widths. The properties of the film and tape are summarized in Table-1 below. The tape provided highly sharp pictures and had an excellent abrasion resistance together with a good traveling property in spite of its relatively smooth film surface.

EXAMPLE 2

Following the procedure of Example 1 except that the polymeric materials used were a combination of Materials A and B at a weight ratio of 50/50, a polyester film and magnetic tapes were prepared. The properties of the film and tapes are also shown in Table-1. Since the surface roughness of the film is greater than the film of Example 1, the sharpness of the pictures generated by the tape of this example is somewhat inferior to the tape of Example 1 but is still superior to prior art video tapes. The tape also had a good abrasion resistance and traveling property.

EXAMPLE 3

A uniform solution consisting essentially of 100 parts of methyl methacrylate, 25 parts of divinylbenzene, 22 parts of ethylvinylbenzene, 1 part of benzoyl peroxide and 100 parts of toluene was dispersed in 700 parts of water and then heated with stirring at 80° C. for 6 hours under nitrogen atmosphere to effect polymerization. The resulting ester group-containing cross-linked particulate polymer had an average diameter of about 0.1 mm. The polymer was washed with demineralized water and extracted twice each with 500 parts of toluene to remove small amounts of unreacted monomers and linear polymers. The particulate polymer was then ground on an attritor for two hours and then one a sand grinder for two hours to give fine powder of the cross-linked polymer having an average diameter of 1.14$\mu$.

In a reactor 100 parts of dimethyl terephthalate, 70 parts of ethylene glycol and 0.09 part of calcium acetate monohydrate were placed and 0.10 part of the finely divided polymer of 1.14$\mu$ average diameter as prepared above was added. In order to effect ester exchange reaction, the mixture was heated in such a way that the initial temperature of 165° C. was raised to 200° C. for 2 hours and then to 230° C. for an additional 2 hours. At the end of the 4-hour reaction period, it was found that the ester exchange reaction was substantially complete. To the reaction mixture, 0.036 part of phosphoric acid and 0.03 part of antimony trioxide were added and the mixture was subjected to polymerization in a conventional manner to give a polyester (Material D).

Following the procedure described in Example 1 except that the polymeric materials used were a combination of chipped Material B (intrinsic viscosity=0.68) and Material D at a weight ratio of 50/50, a film and magnetic tapes were prepared. The properties of the film and tapes are shown in Table-1.

Comparative Example 1

Following the procedure of Example 1 except that the polymeric materials used were Materials A and B at a weight ratio of 10/90 and the film was drawn in the longitudinal direction at 85° C. and at a draw ratio of 3.8 and then in the transverse direction at 110° C. and at a draw ratio of 3.7 and finally heat-set under tension at 190° C. for 2 seconds, a film and magnetic tapes were prepared. The properties of the film and tapes thus obtained are shown in Table-1. The test tape initially showed sharp pictures, but upon repeated passes the number of dropouts was increased because of accumulation of abrasion dust which was attributable to the poor abrasion resistance of the tape. Upon repeated passes, also the traveling of the tape became unstable, causing some troubles such as frequent interruptions of tape traveling.

Comparative Example 2

Following the procedure of Example 1 except that the polymeric materials used were Materials A, B and C at a weight ratio of 10:88:2 and the heat setting was carried out at 220° C. for 2 seconds, a film and magnetic tapes were prepared. The properties of the film and tapes are shown in Table-1. As can be seen from Table-1, the film and tapes had so poor abrasion resistance that the deck was heavily contaminated with the abrasion dust.

The traveling property of the tape was also poor, resulting in interruptions of tape traveling. Such tape, therefore, could not be put into practical use.

TABLE 1

| | Example No. | | | Comp. Ex. No. | |
|---|---|---|---|---|---|
| | 1 | 2 | 3 | 1 | 2 |
| $N_1\bar{h}$ ($\mu$m/mm) | 1.42 | 2.20 | 1.80 | 0.60 | 1.01 |
| $\bar{\theta}\sqrt{\overline{H^2}}$ ($\mu$m · deg.) | 2.00 | 2.35 | 2.20 | 0.30 | 0.45 |
| $\bar{n}$ | 1.5975 | 1.5976 | 1.5979 | 1.6005 | 1.6032 |
| $\mu_D$ | 0.337 | 0.315 | 0.320 | 0.385 | 0.373 |
| Abrasion resistance | A | A | B | C | D |
| Surface hardness (kg/cm$^2$) | 1,100 | 1,120 | 1,150 | 1,650 | 2,100 |
| Adhesion (g/4 mm) | 8.0 | 8.0 | 8.4 | 6.3 | 5.5 |
| Number of dropouts during 20 passes | 8 | 10 | 13 | 20 | 50 |

REFERENCE DATA (1) Commercially Available Video Tape A

| | |
|---|---|
| $N_1\bar{h}$ | 2.48 |
| $\bar{\theta}\sqrt{\overline{H^2}}$ | 4.14 |
| $\bar{n}$ | 1.603 |
| Abrasion resistance | C |

(2) Commercially Available Audio Tape B

| | |
|---|---|
| $N_1\bar{h}$ | 3.91 |
| $\bar{\theta}\sqrt{\overline{H^2}}$ | 7.25 |
| $\bar{n}$ | 1.602 |
| Abrasion resistance | C |

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A polyester film suitable for use in magnetic tapes having the surface roughness characteristics represented by the following equations:

$$N_1\bar{h} \leq 2.3 \tag{i}$$

$$0.4 \leq \bar{\theta}\sqrt{\overline{H^2}} \tag{ii}$$

$$\bar{n} \leq 1.5979 \tag{iii}$$

wherein
  $N_1$ is the number of peaks of surface projections per millimeter;
  $\bar{h}$ is the average height in $\mu$m of the surface projections;
  $\bar{\theta}$ is the average steepness in degree of the surface projections;
  $\overline{H^2}$ is the mean square height in $\mu$m$^2$ of the surface projections; and $\bar{n}$ is the average refractive index, the surface roughness of the film being imparted to said film by the precipitation of inert fine particles in said polyester.

2. The polyester film of claim 1, wherein said fine particles are particles of an ester exchange catalyst.

3. A polyester film suitable for use in magnetic tapes having the surface roughness characteristics represented by the following equations:

$$N_1 \bar{h} \leq 2.3 \quad \text{(i)}$$

$$0.4 \leq \bar{\theta} \sqrt{\overline{H^2}} \quad \text{(ii)}$$

$$\bar{n} \leq 1.5979 \quad \text{(iii)}$$

wherein $N_1$ is the number of peaks of surface projections per millimeter;

$\bar{h}$ is the average height in $\mu m$ of the surface projections;

$\bar{\theta}$ is the average steepness in degree of the surface projections;

$\overline{H^2}$ is the mean square height of $\mu m^2$ of the surface projections; and $\bar{n}$ is the average refractive index, the surface roughness of the film being imparted to said film by the addition of microparticles to the polyester which are insoluble in the polyester.

4. The polyester film of claim 3, wherein said microparticles are oxides or salts of Group II, Group III or Group IV elements in the Periodic Table.

5. The polyester film of claim 4, wherein said microparticles have a particle size range from 0.5–3.0$\mu$.

6. The polyester film of claim 1 or 3, wherein the polyester is polyethyleneterephthalate.

7. The polyester film of claim 1 or 3, wherein said film has a thickness of 5 to 100$\mu$.

8. The polyester film of claim 1 or 3 wherein said film is biaxially oriented.

* * * * *